United States Patent
Tanaka

(10) Patent No.: US 12,481,152 B2
(45) Date of Patent: Nov. 25, 2025

(54) LIGHT SCANNING DEVICE

(71) Applicant: FUJIFILM Corporation, Tokyo (JP)

(72) Inventor: Nobuya Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 500 days.

(21) Appl. No.: 18/049,676

(22) Filed: Oct. 26, 2022

(65) Prior Publication Data

US 2023/0136877 A1 May 4, 2023

(30) Foreign Application Priority Data

Oct. 29, 2021 (JP) ................. 2021-178340

(51) Int. Cl.
*G02B 26/08* (2006.01)
*G02B 26/10* (2006.01)
*G02B 27/01* (2006.01)

(52) U.S. Cl.
CPC ....... *G02B 26/101* (2013.01); *G02B 26/0816* (2013.01); *G02B 27/0172* (2013.01); *G02B 2027/0178* (2013.01)

(58) Field of Classification Search
CPC .............. G02B 26/101; G02B 26/0816; G02B 27/0172; G02B 2027/0178; G02B 26/105; G02B 2027/0123; G02B 2027/0174; G02B 27/0093; G02B 26/0833; G02B 26/10; G02B 27/0176
See application file for complete search history.

(56) References Cited

U.S. PATENT DOCUMENTS

| | | |
|---|---|---|
| 10,088,682 B2 | 10/2018 | Arakawa et al. |
| 11,157,072 B1 | 10/2021 | Topliss et al. |
| 2010/0149073 A1 | 6/2010 | Chaum et al. |
| 2015/0036221 A1 | 2/2015 | Stephenson |
| 2017/0102540 A1 | 4/2017 | Mcglew et al. |
| 2018/0299680 A1* | 10/2018 | Alexander ........... G02B 27/017 |
| 2019/0285897 A1 | 9/2019 | Topliss et al. |

FOREIGN PATENT DOCUMENTS

| | | |
|---|---|---|
| JP | 2002-90688 A | 3/2002 |
| JP | 2015-111231 A | 6/2015 |
| WO | WO 2021/092314 A1 | 5/2021 |

OTHER PUBLICATIONS

European Communication pursuant to Article 94(3) EPC for corresponding European Application No. 22 202 106.5, dated Jul. 31, 2024.
Extended European Search Report for European Application No. 22202106.5, dated Mar. 14, 2023.
Jang et al., "Retinal 3D: Augmented Reality Near-Eye Display Via Pupil-Tracked Light Field Projection on Retina", ACM Transactions on Graphics, vol. 36, No. 6, Article 190, Nov. 2017, pp. 1-13.
Japanese Office Action for corresponding Japanese Application No. 2021-178340, dated Mar. 18, 2025, with English translation.

* cited by examiner

*Primary Examiner* — Euncha P Cherry

(74) *Attorney, Agent, or Firm* — Birch, Stewart, Kolasch & Birch, LLP

(57) ABSTRACT

A light scanning device includes a light source that emits laser light, a mirror device that includes a movable mirror swinging about at least one axis and directionally changes the laser light emitted from the light source by reflecting the laser light using the movable mirror, and a condensing optical system that condenses the laser light directionally changed by the mirror device to a center of an eyeball.

2 Claims, 9 Drawing Sheets

LIGHT SCANNING DEVICE

CROSS-REFERENCE TO RELATED APPLICATIONS

The present application claims priority under 35 U.S.C. § 119 to Japanese Patent Application No. 2021-178340 filed on Oct. 29, 2021. The above application is hereby expressly incorporated by reference, in its entirety, into the present application.

BACKGROUND

1. Technical Field

The disclosed technology relates to a light scanning device.

2. Description of the Related Art

In recent years, augmented reality (AR) glasses that display a virtual image, various information, and the like in a superimposed manner on an actual view have been in practical use. The AR glasses are also referred to as smart glasses, a head mounted display (HMD), AR eyeglasses, and the like.

Some AR glasses employ a method of directly scanning laser light emitted from a light source to retinas of eyes of a user by directionally changing the laser light using a movable mirror (also referred to as a micro electro mechanical systems (MEMS) mirror) configured with MEMS. This method is referred to as a retinal scanning method. In the AR glasses of the retinal scanning method, the laser light directionally changed by the movable mirror is condensed to pupils of the eyes of the user by a condensing optical system and is scanned to the retinas. Since the retinal scanning method does not depend on a focus adjustment function of crystalline lenses of the eyes, the user can clearly see a video projected to the retinas even in a case where the user is nearsighted or farsighted or has presbyopia. In addition, the AR glasses of the retinal scanning method have high energy efficiency and thus, can be driven for a long time period.

On the other hand, the AR glasses of the retinal scanning method have a problem in that the video is not seen in a case where a condensing point of the laser light by the condensing optical system does not match positions of the pupils. That is, the video is not seen in a case where the positions of the pupils deviate from the condensing point because the user moves the eyes. This problem is known as a narrow movable range of the eyes for clearly seeing the video, that is, a narrow eyebox.

Accordingly, an objective for the AR glasses of the retinal scanning method is to expand the eyebox. US2018/0299680A discloses a technology for expanding an eyebox by replicating laser light directionally changed by a movable mirror using a prism or a light guide plate. In addition, Changwon Jang, Kiseung Bang, Seokil Moon, Jonghyun Kim, Seungjae Lee, and Byoungho Lee. 2017. Retinal 3D: augmented reality near-eye display via pupil-tracked light field projection on retina. ACM Trans. Graph. 36, 6, Article 190 (November 2017). Retrieved from the Internet: <URL: http://library.usc.edu.ph/ACM/TOG%2036/content/papers/190-0330-jang.pdf> discloses a technology for expanding an eyebox by condensing laser light to positions of pupils using a mirror while tracking the positions of the pupils using eye tracking.

SUMMARY

However, the technologies disclosed in US2018/0299680A and Changwon Jang, Kiseung Bang, Seokil Moon, Jonghyun Kim, Seungjae Lee, and Byoungho Lee. 2017. Retinal 3D: augmented reality near-eye display via pupil-tracked light field projection on retina. ACM Trans. Graph. 36, 6, Article 190 (November 2017). Retrieved from the Internet: <URL:http://library.usc.edu.ph/ACM/TOG%2036/content/papers/190-0330-jang.pdf> have a complicated configuration for expanding the eyebox. Thus, a technology that can expand the eyebox with a simpler configuration is desired.

An object of the disclosed technology is to provide a light scanning device that can expand an eyebox with a simple configuration.

In order to accomplish the above object, a light scanning device according to an aspect of the present disclosure comprises a light source that emits laser light, a mirror device that includes a movable mirror swinging about at least one axis and directionally changes the laser light emitted from the light source by reflecting the laser light using the movable mirror, and a condensing optical system that condenses the laser light directionally changed by the mirror device to a center of an eyeball.

It is preferable that the condensing optical system is a half-silvered mirror or a mirror having a concave surface and condenses at least a part of the laser light directionally changed by the mirror device to the center of the eyeball by reflecting at least the part of the laser light using the concave surface.

It is preferable that the concave surface is an elliptical surface, and a swinging axis of the movable mirror is positioned at one focal point of the elliptical surface, and the center of the eyeball is positioned at the other focal point of the elliptical surface.

It is preferable that the condensing optical system is composed of a grating or a hologram.

It is preferable that the movable mirror is configured to be swingable about a first axis and a second axis that are orthogonal to each other.

According to the disclosed technology, a light scanning device that can expand an eyebox with a simple configuration can be provided.

BRIEF DESCRIPTION OF THE DRAWINGS

Exemplary embodiments according to the technique of the present disclosure will be described in detail based on the following figures, wherein.

DETAILED DESCRIPTION

Hereinafter, an embodiment according to the disclosed technology will be described in detail with reference to the drawings. As an example, a form of applying a light scanning device according to the embodiment of the disclosed technology to AR glasses will be described in each embodiment below.

Figure 1:
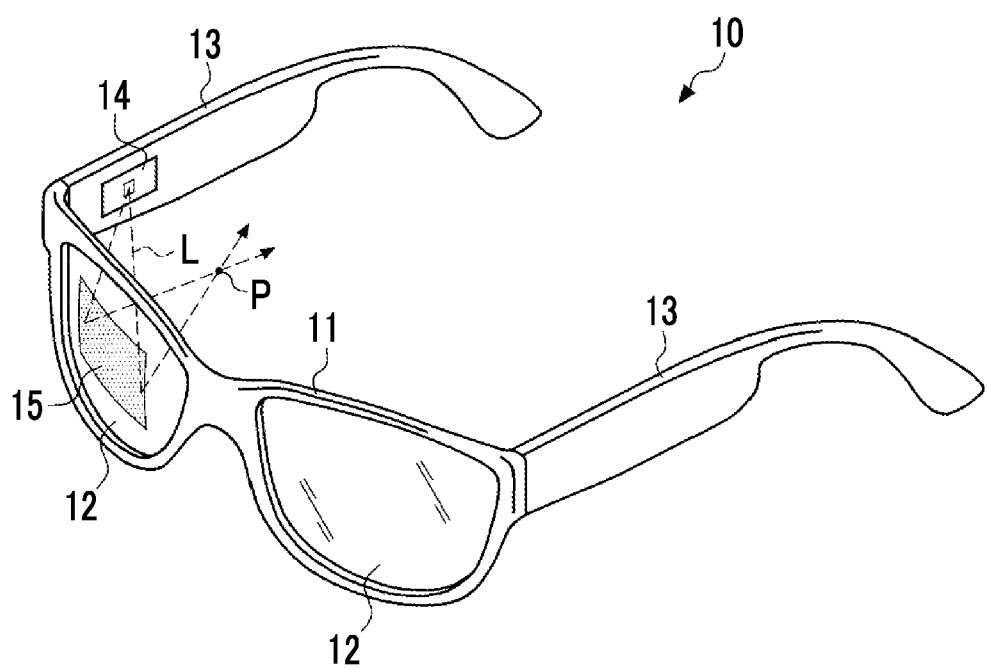
FIG. 1 is a schematic diagram illustrating an example of a configuration of AR glasses.

FIG. 1 illustrates a configuration of AR glasses 10 according to the present embodiment. As illustrated in FIG. 1, the AR glasses 10 are configured with a frame 11, two lenses 12, two temples 13, a module 14, and a half-silvered mirror 15. The two lenses 12 are held in the frame 11. Each of the two temples 13 is connected to an end part of the frame 11 through a hinge (not illustrated).

The module 14 is provided in one of the two temples 13. In addition, the half-silvered mirror 15 is provided in the lens 12 on a temple 13 side in which the module 14 is provided out of the two lenses 12. In the present embodiment, the module 14 is provided in the temple 13 on a right eye side, and the half-silvered mirror 15 is provided in the lens 12 on the right eye side. The module 14 may be provided in both of the two temples 13, and the half-silvered mirror 15 may be provided in both of the lenses 12.

The module 14 emits laser light L modulated in accordance with an image signal toward the half-silvered mirror 15. The half-silvered mirror 15 reflects the laser light L and condenses the laser light L to a center of an eyeball of a user wearing the AR glasses 10. Reference numeral P denotes a condensing position of the laser light L by the half-silvered mirror 15. The half-silvered mirror 15 is an example of a "condensing optical system" according to the embodiment of the disclosed technology.

Figure 2:
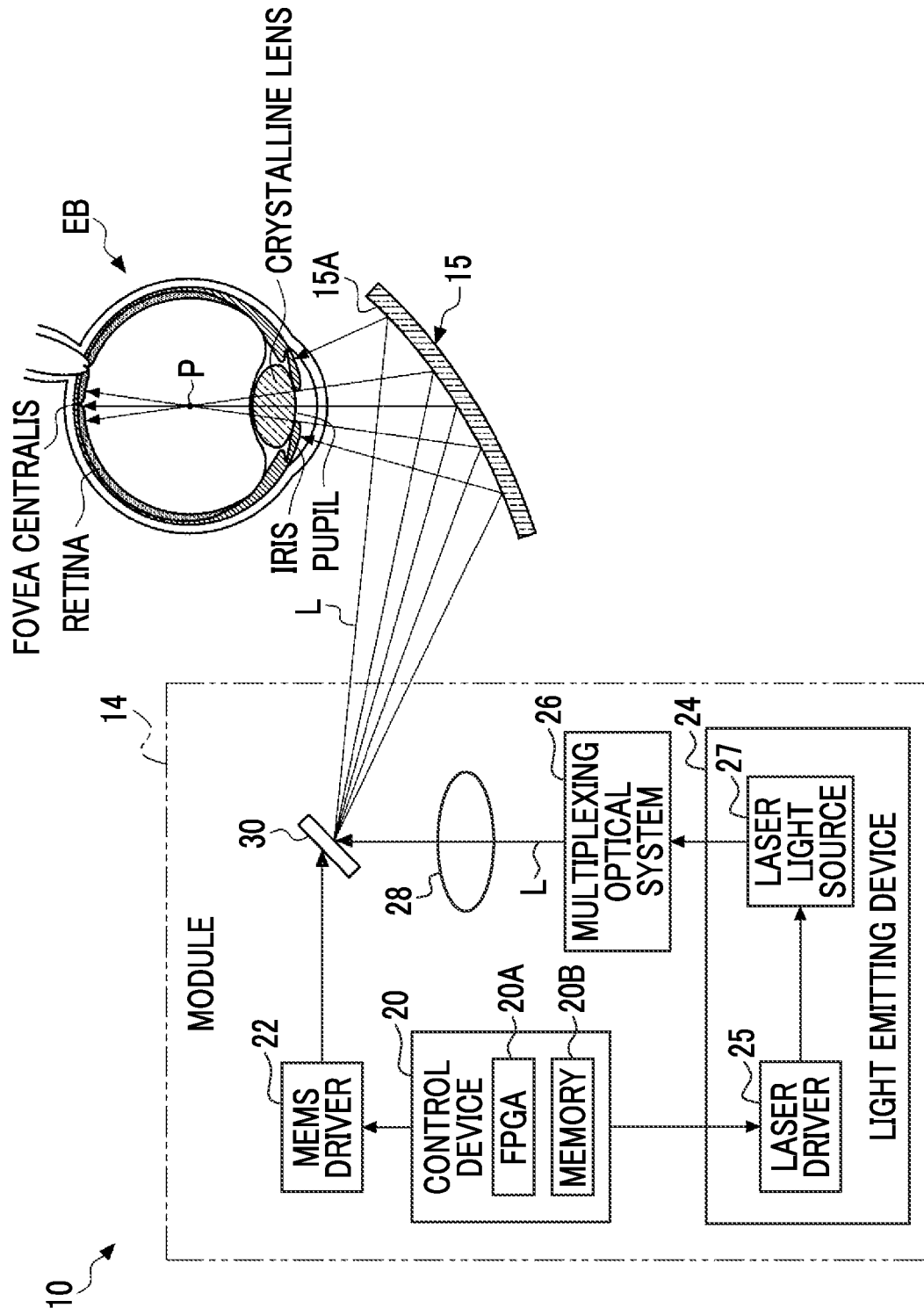
FIG. 2 is a diagram illustrating an example of configurations of a module and a half-silvered mirror.

FIG. 2 illustrates configurations of the module 14 and the half-silvered mirror 15. As illustrated in FIG. 2, the module 14 comprises a control device 20, a micro electro mechanical systems (MEMS) driver 22, a light emitting device 24, a multiplexing optical system 26, a collimator 28, and a MEMS mirror 30. The MEMS mirror 30 is an example of a "mirror device" according to the embodiment of the disclosed technology.

The light emitting device 24 includes a laser driver 25 and a laser light source 27. The laser driver 25 of the present embodiment drives the laser light source 27 based on an intensity modulation signal supplied from the control device 20 and causes the laser light L for forming an image to be output from the laser light source 27. For example, the laser light source 27 outputs the laser light L of three colors of red (R), green (G), and blue (B). The laser light source 27 is an example of "light source" according to the embodiment of the disclosed technology.

The laser light L output from the laser light source 27 is multiplexed by the multiplexing optical system 26. Then, the MEMS mirror 30 is irradiated with the multiplexed laser light L through the collimator 28. The laser light L with which the MEMS mirror 30 is irradiated is reflected toward the half-silvered mirror 15 by the MEMS mirror 30.

The MEMS driver 22 drives the MEMS mirror 30 under control of the control device 20. In the MEMS mirror 30, a mirror portion 40 (refer to FIG. 3) that reflects the laser light independently swings about each of two axes orthogonal to each other as a central axis. In the present embodiment, the laser light is scanned in a state of drawing a Lissajous curve on the half-silvered mirror 15 by the swing of the mirror portion 40 based on a driving signal. The Lissajous curve is a curve that is decided by a swing frequency about a first axis, a swing frequency about a second axis, and a phase difference therebetween. The mirror portion 40 is an example of a "movable mirror" according to the embodiment of the disclosed technology. The MEMS mirror 30 directionally changes the laser light L by reflecting the laser light L using the mirror portion 40. Directional changing refers to changing a traveling direction of the laser light L.

The control device 20 of the present embodiment includes a field programmable gate array (FPGA) 20A and a memory 20B. For example, the memory 20B is a volatile memory and stores various information such as the image signal representing the image projected to the half-silvered mirror 15. For example, the memory 20B stores the image signal input from an outside of the AR glasses 10.

A concave surface 15A that specularly reflects at least a part of the laser light L incident from the MEMS mirror 30 is formed in the half-silvered mirror 15. In addition to specularly reflecting at least a part of the laser light L, the half-silvered mirror 15 transmits external light. In the present embodiment, the concave surface 15A is an elliptical surface. More specifically, the concave surface 15A is a surface of a part of a rotational ellipsoid obtained by rotating an ellipse about an axis passing through two focal points of the ellipse. That is, the concave surface 15A is an off-axis elliptical surface. Light output from one focal point always reaches the other focal point in a case where the light is specularly reflected by the concave surface 15A.

The AR glasses 10 are configured such that a swinging axis of the MEMS mirror 30 is positioned at one focal point of the concave surface 15A and a center of an eyeball EB of the user is positioned at the other focal point. Based on this geometrical relationship, the laser light L incident on the half-silvered mirror 15 from the MEMS mirror 30 is reflected by the concave surface 15A and is condensed to the center of the eyeball EB.

Figure 3:
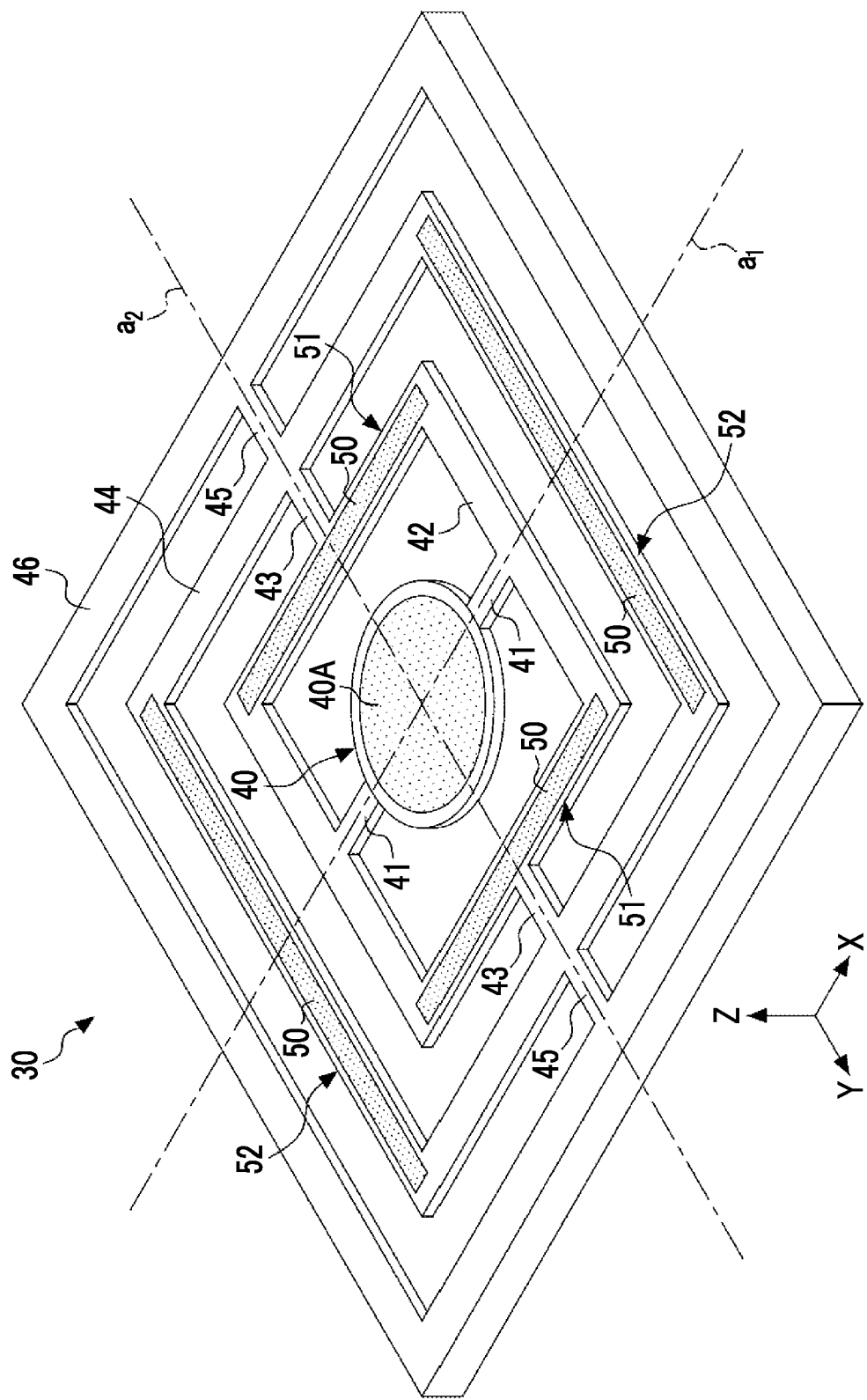
FIG. 3 is a schematic perspective view illustrating an example of a configuration of a MEMS mirror.

FIG. 3 illustrates an example of a configuration of the MEMS mirror 30. The MEMS mirror 30 includes the mirror portion 40, a first support portion 41, a first movable frame 42, a second support portion 43, a second movable frame 44, a connecting portion 45, and a fixed frame 46.

The mirror portion 40 has a reflecting surface 40A on which an incidence ray is reflected. For example, the reflecting surface 40A is formed with a thin metal film of gold (Au), aluminum (Al), silver (Ag), or a silver alloy. For example, a shape of the reflecting surface 40A is a circular shape.

The first support portion 41 is arranged outside the mirror portion 40 at each of positions that face with a second axis $a_2$ interposed therebetween. The first support portions 41 are connected to the mirror portion 40 on a first axis $a_1$ and support the mirror portion 40 in a swingable manner about the first axis $a_1$.

The first movable frame 42 is a rectangular frame surrounding the mirror portion 40 and is connected to the mirror portion 40 through the first support portions 41 on the first axis $a_1$. A piezoelectric element 50 is formed on the first movable frame 42 at each of positions that face with the first axis $a_1$ interposed therebetween. In such a manner, a pair of first actuators 51 are configured by forming two piezoelectric elements 50 on the first movable frame 42.

The pair of first actuators 51 are arranged at positions that face with the first axis $a_1$ interposed therebetween. The first actuators 51 cause the mirror portion 40 to swing about the first axis $a_1$ by applying rotational torque about the first axis $a_1$ to the mirror portion 40.

The second support portion 43 is arranged outside the first movable frame 42 at each of positions that face with the first axis $a_1$ interposed therebetween. The second support portions 43 are connected to the first movable frame 42 on the second axis $a_2$ and support the first movable frame 42 and the mirror portion 40 in a swingable manner about the second axis $a_2$. In the present embodiment, the second support portions 43 are torsion bars that stretch along the second axis $a_2$.

The second movable frame 44 is a rectangular frame surrounding the first movable frame 42 and is connected to the first movable frame 42 through the second support portions 43 on the second axis $a_2$. The piezoelectric element 50 is formed on the second movable frame 44 at each of positions that face with the second axis $a_2$ interposed therebetween. In such a manner, a pair of second actuators 52 are configured by forming two piezoelectric elements 50 on the second movable frame 44.

The pair of second actuators 52 are arranged at positions that face with the second axis $a_2$ interposed therebetween. The second actuators 52 cause the mirror portion 40 to swing about the second axis $a_2$ by applying rotational torque about the second axis $a_2$ to the mirror portion 40 and the first movable frame 42.

The connecting portion 45 is arranged outside the second movable frame 44 at each of positions that face with the first axis $a_1$ interposed therebetween. The connecting portions 45 are connected to the second movable frame 44 on the second axis $a_2$.

The fixed frame 46 is a rectangular frame surrounding the second movable frame 44 and is connected to the second movable frame 44 through the connecting portions 45 on the second axis $a_2$.

In the present embodiment, the first axis $a_1$ and the second axis $a_2$ are orthogonal to each other. In the following description, a direction parallel to the first axis $a_1$ will be referred to as an X direction, a direction parallel to the second axis $a_2$ will be referred to as a Y direction, and a direction orthogonal to the first axis $a_1$ and the second axis $a_2$ will be referred to as a Z direction.

Figure 4:
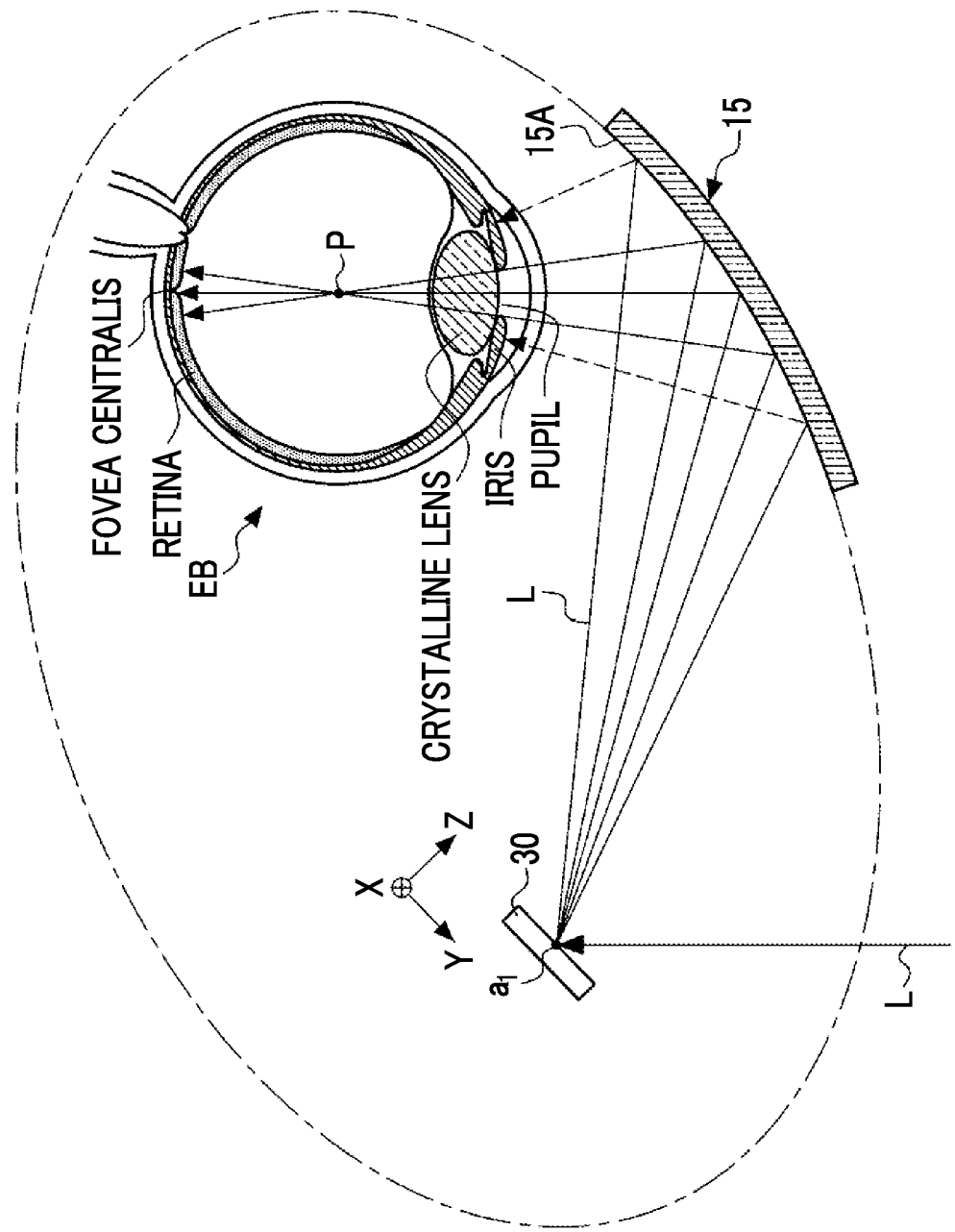
FIG. 4 is a diagram illustrating a positional relationship among the MEMS mirror, the half-silvered mirror, and an eyeball.

FIG. 4 illustrates a positional relationship among the MEMS mirror 30, the half-silvered mirror 15, and the eyeball EB. As illustrated in FIG. 4, the MEMS mirror 30 is arranged such that the first axis $a_1$ that is one swinging axis passes through one focal point of the concave surface 15A that is an elliptical surface. Specifically, the MEMS mirror 30 is arranged such that an intersection between the first axis $a_1$ and the second axis $a_2$ matches one focal point of the concave surface 15A that is an elliptical surface. Based on this geometrical relationship, a condensing point P of the laser light L reflected by the concave surface 15A matches the other focal point of the concave surface 15A.

The AR glasses 10 are configured such that the center of the eyeball EB matches the condensing point P in a case where the user wears the AR glasses 10. Thus, in a case where the user sees the concave surface 15A of the half-silvered mirror 15 in a state of wearing the AR glasses 10, a part of the laser light L reflected by the concave surface 15A is incident into the eyeball EB through a pupil and is condensed to the condensing point P and then, is incident on a retina. The laser light L incident into the eyeball EB is mainly incident on a region corresponding to a macula lutea including a fovea centralis in the retina. The fovea centralis is a part in which cells for recognizing colors and shapes are concentrated and has the highest resolution in the retina. The user recognizes a video based on the laser light L projected to the retina.

In the video projected to the concave surface 15A of the half-silvered mirror 15 by the MEMS mirror 30, the user can clearly recognize a part positioned at a center in a visual line direction.

While FIG. 4 illustrates a state where the concave surface 15A condenses the laser light L to the condensing point P in a YZ plane orthogonal to the first axis $a_i$, the concave surface 15A is not limited to the YZ plane and also condenses the laser light L to the condensing point P in a plane other than the YZ plane including the two focal points.

Figure 5:
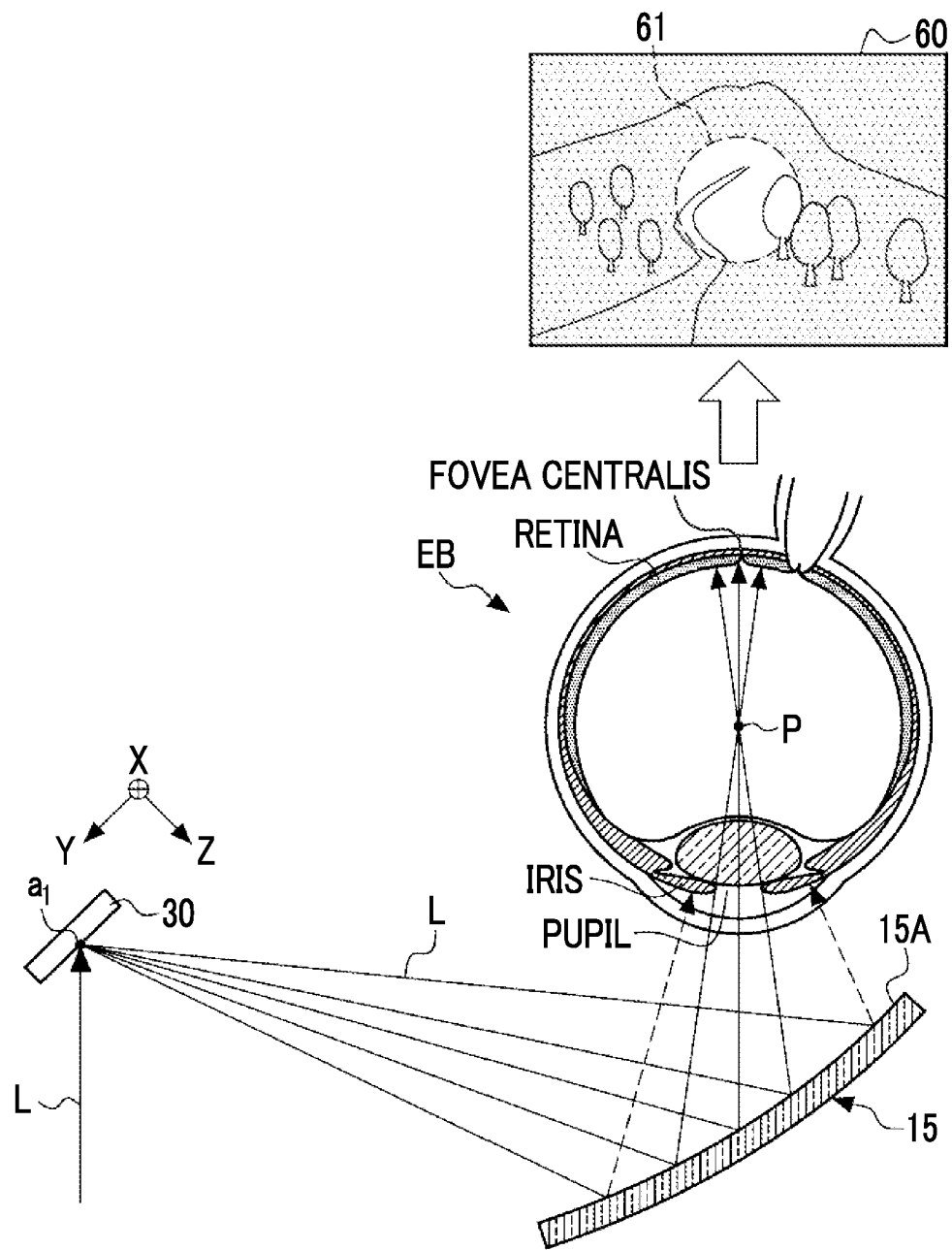
FIG. 5 is a diagram illustrating a state where a user sees the front.
Figure 6:
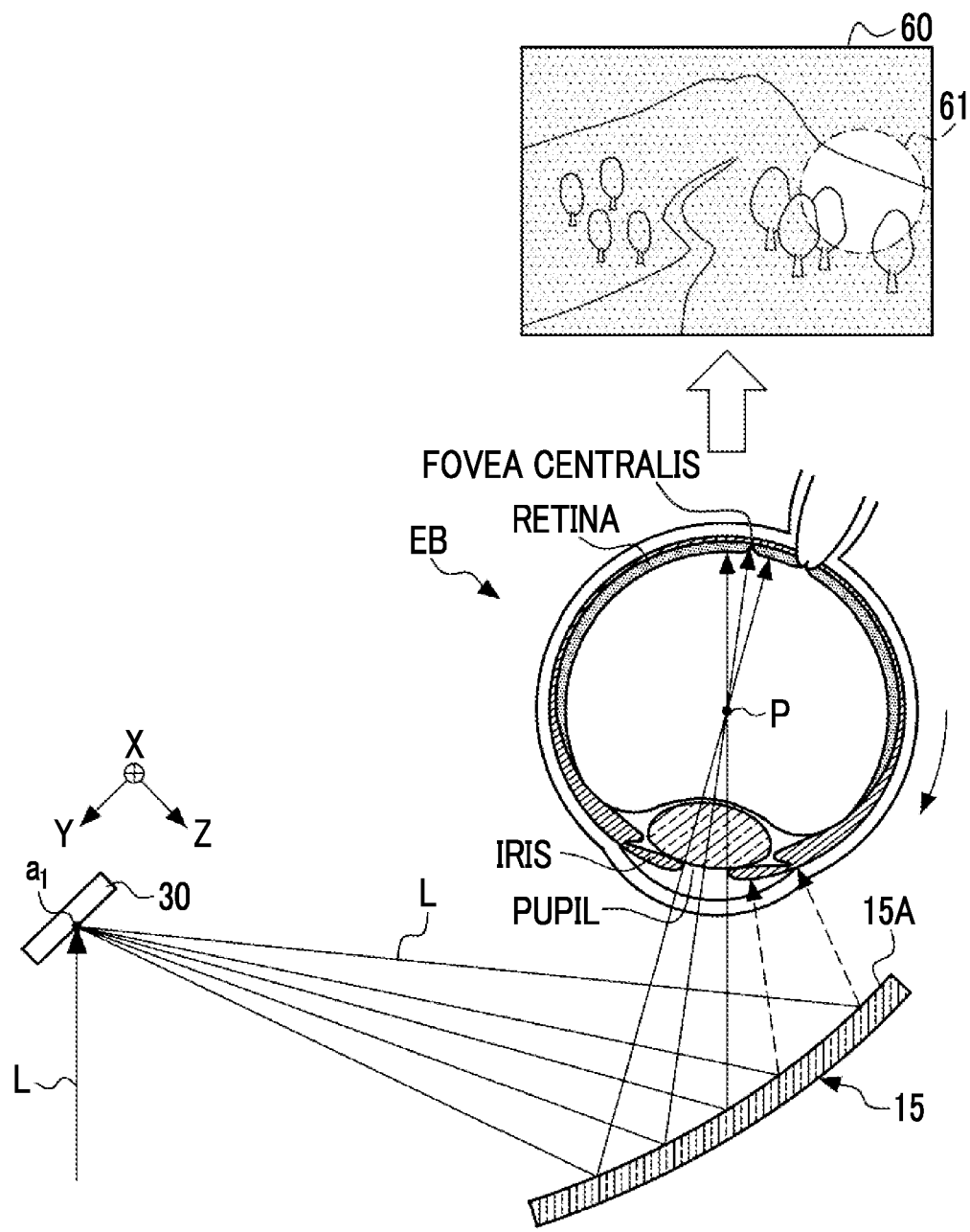
FIG. 6 is a diagram illustrating a state where the user moves a visual line to a right side from the front.
Figure 7:
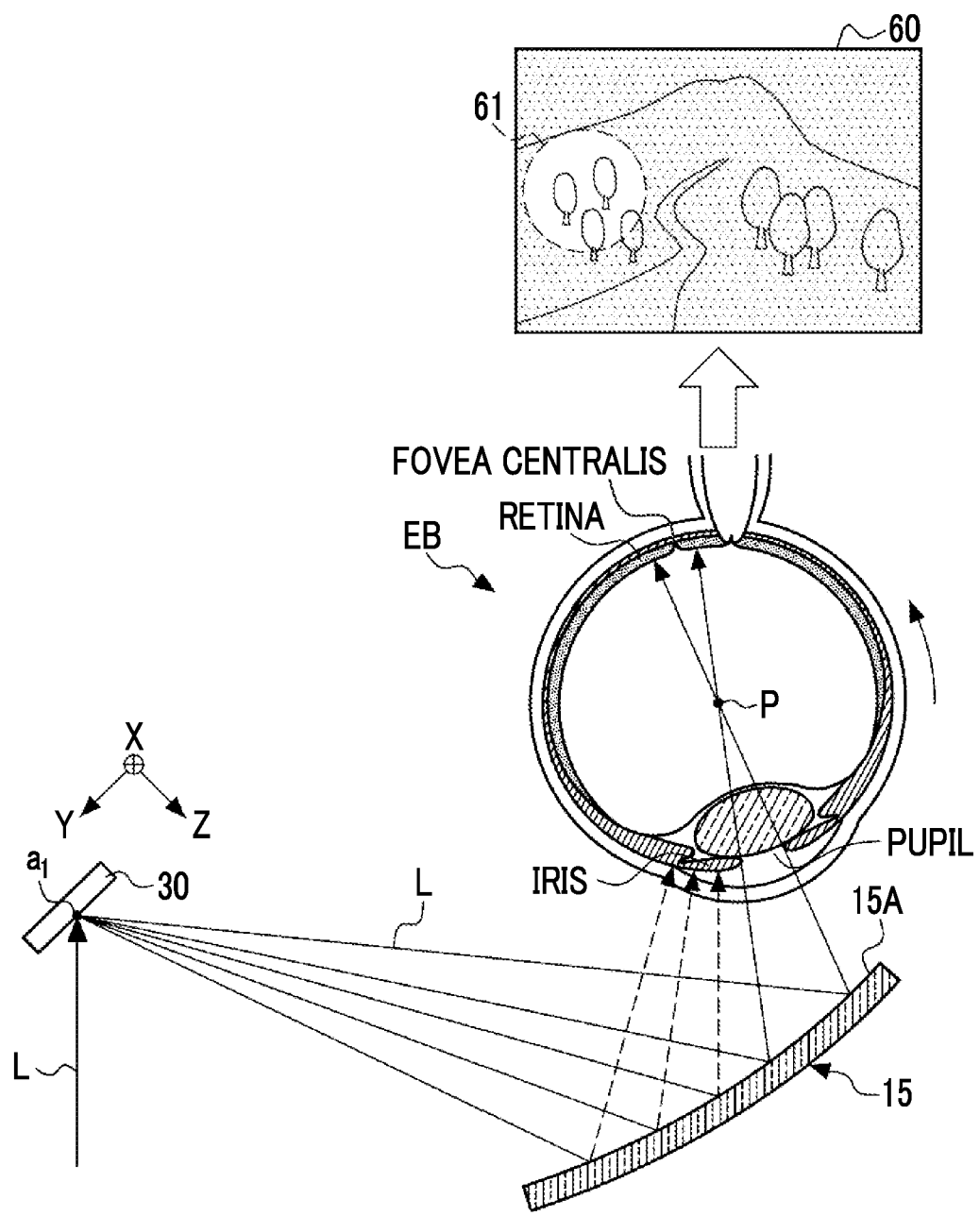
FIG. 7 is a diagram illustrating a state where the user moves the visual line to a left side from the front.

FIG. 5 to FIG. 7 are diagrams for describing expansion of an eyebox by the AR glasses 10 according to the present embodiment. FIG. 5 illustrates a state where the user sees the front. In this case, the laser light L related to the video at the center of the video projected to the concave surface 15A of the half-silvered mirror 15 is mainly incident near the fovea centralis of the retina through the pupil. Reference numeral 60 denotes an image recognized by the user in a brain. Reference numeral 61 denotes a region (hereinafter, referred to as a high-definition region) that can be clearly recognized by the user in the entire image 60. The high-definition region 61 corresponds to a region near the fovea centralis of the retina. In FIG. 5, the high-definition region 61 is positioned at a center of the image 60.

FIG. 6 illustrates a state where the user moves a visual line to a right side from the front. In this case, the laser light L related to the video on a right side of the video projected to the concave surface 15A of the half-silvered mirror 15 is mainly incident near the fovea centralis of the retina through the pupil. In FIG. 6, the high-definition region 61 is positioned on a right side of the image 60.

FIG. 7 illustrates a state where the user moves the visual line to a left side from the front. In this case, the laser light L related to the video on a left side of the video projected to the concave surface 15A of the half-silvered mirror 15 is mainly incident near the fovea centralis of the retina through the pupil. In FIG. 7, the high-definition region 61 is positioned on a left side of the image 60.

As illustrated in FIG. 5 to FIG. 7, in the AR glasses 10 according to the present embodiment, since the laser light L reflected by the concave surface 15A of the half-silvered mirror 15 is condensed to the center of the eyeball EB, the laser light L of a region (corresponds to the high-definition region 61) that the user focuses on in the video projected to the concave surface 15A is always incident near the fovea centralis of the retina even in a case where a position of the pupil is moved because the user moves the visual line. In the embodiment of the disclosed technology, while the region that can be clearly recognized by the user in the video projected to the concave surface 15A of the half-silvered mirror 15 is slightly narrow, the region that the user focuses on can be always clearly recognized even in a case where the visual line is moved. That is, according to the embodiment of the disclosed technology, the eyebox can be expanded with a simple configuration.

Figure 8:
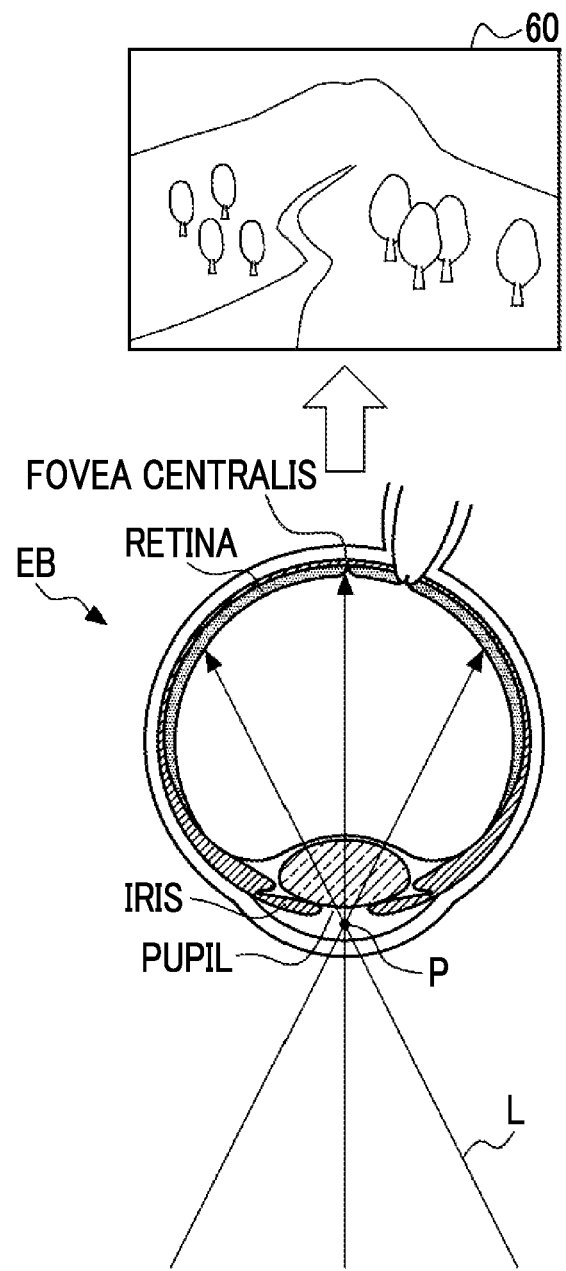
FIG. 8 is a diagram illustrating a state where the user sees the front in a retinal scanning method of the related art.

FIG. 8 is a diagram for describing a retinal scanning method of the related art. In the retinal scanning method of the related art, the laser light L is condensed near a center of the pupil and then, is incident on the retina. FIG. 8 illustrates a state where the user sees the front. In this case, since the condensing point P of the laser light L is positioned near the center of the pupil, an incidence angle of the laser light L incident on the retina is wide. That is, in the retinal scanning method of the related art, in a case where the user sees the front, a visual field is wide, and the entire image 60 can be recognized. On the other hand, in the retinal scanning method of the related art, in a case where the user moves the visual line, the position of the pupil deviates from the condensing point P. Thus, there is a problem that the eyebox is narrow.

Figure 9:
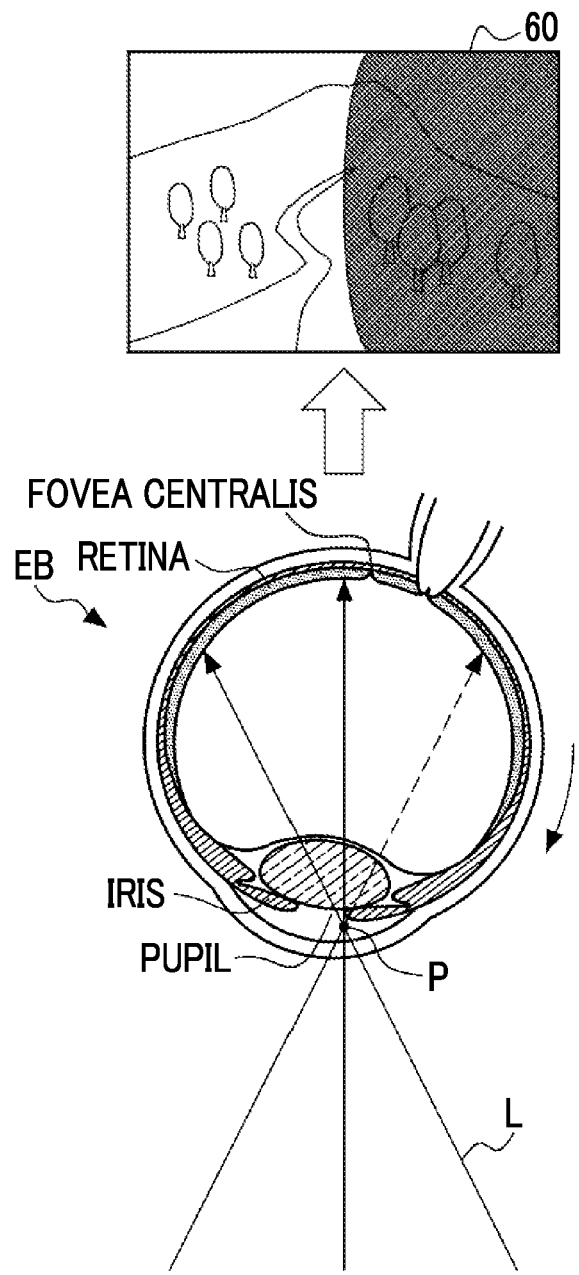
FIG. 9 is a diagram illustrating a state where the user moves the visual line to the right side from the front in the retinal scanning method of the related art.

FIG. 9 illustrates a state where the user moves the visual line to the right side from the front in the retinal scanning method of the related art. In this case, for example, the laser light incident from a right side of the pupil is blocked by an iris positioned on a left side of the pupil. Consequently, the video in a region on the right side of the image 60 is not seen. Since the video on the right side is not seen even in a case where the user moves the visual line to the right side in order to see the right side, the user feels stressed.

On the other hand, in a retinal scanning method according to the embodiment of the present disclosure, the laser light L is condensed to the center of the eyeball EB. Thus, even in a case where the position of the pupil is moved because the user moves the visual line, the user can always clearly recognize near a center of the visual line and does not feel stressed unlike in the related art. In the retinal scanning method according to the embodiment of the present disclosure, the visual field is slightly narrowed compared to the retinal scanning method of the related art. However, generally, a person can only clearly recognize near a center of the visual field and needs to move eyes in accordance with a region of interest in a case of, for example, reading a text. Thus, as long as the user can always clearly recognize near the center of the visual line as in the retinal scanning method according to the embodiment of the present disclosure, there is no practical problem even in a case where an edge part region cannot be clearly recognized.

Modification Example

Next, various modification examples of the embodiment will be described. In the embodiment, while the condensing optical system is composed of the half-silvered mirror 15, various modifications can be made to the condensing optical system.

The condensing optical system is not limited to a half-silvered mirror and may be a mirror that is provided with a metal film or the like on a concave surface and highly reflects the laser light L. By using a mirror as the condensing optical system, a light scanning device that projects an immersive video can be configured.

In addition, the condensing optical system is not limited to a half-silvered mirror or a mirror and can be composed of a grating or a hologram (for example, refer to US2018/0299680A). By using a grating or a hologram as the condensing optical system, the laser light L incident from the MEMS mirror 30 can be reflected in a direction other than a reflection direction of specular reflection and condensed to the center of the eyeball EB. That is, by using a grating or a holographic reflective plate as the condensing optical system, even in a case where the lenses 12 are flat surfaces or surfaces having a slight gradient, the condensing optical system can be provided on surfaces of the lenses 12, and a degree of freedom in design of the AR glasses 10 is improved.

In addition, the configuration of the MEMS mirror 30 illustrated in the embodiment can be appropriately changed. For example, in the embodiment, while the first actuator 51 and the second actuator 52 have a ring shape, one or both of the first actuator 51 and the second actuator 52 can have a meander structure. In addition, a support member having a configuration other than a torsion bar can be used as the first support portion 41 and the second support portion 43.

In addition, various modifications can be made to a hardware configuration of the control device 20. A processing unit of the control device 20 may be configured with one processor or may be configured with a combination of two or more processors of the same type or different types (for example, a combination of a plurality of field programmable gate arrays (FPGAs) and/or a combination of a CPU and an FPGA).

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. A light scanning device comprising:
a light source that emits laser light;
a mirror device that includes a movable mirror swinging about at least one axis and directionally changes the laser light emitted from the light source by reflecting the laser light using the movable mirror; and
a condensing optical system that is a half-silvered mirror or a mirror having a concave surface and condenses at least a part of the laser light directionally changed by the mirror device to a center of an eyeball by reflecting at least the part of the laser light using the concave surface,
wherein the concave surface is an elliptical surface, and a swinging axis of the movable mirror is positioned at one focal point of the elliptical surface, and the center of the eyeball is positioned at the other focal point of the elliptical surface.

2. The light scanning device according to claim 1, wherein the movable mirror is configured to be swingable about a first axis and a second axis that are orthogonal to each other.

\* \* \* \* \*